United States Patent
Ito et al.

[19]

[11] Patent Number: 5,897,118
[45] Date of Patent: *Apr. 27, 1999

[54] MECHANICAL SEAL FOR A COMPRESSOR AND CENTRIFUGAL COMPRESSOR COMPRISING THE MECHANICAL SEAL

[75] Inventors: Atsushi Ito, Inayoshihigashi; Hiroshi Yamasaki, Shimoinayoshi, both of Japan

[73] Assignee: Hitachi, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/757,568

[22] Filed: Nov. 27, 1996

[30] Foreign Application Priority Data

Nov. 27, 1995 [JP] Japan ................................. 7-307131

[51] Int. Cl.$^6$ .................................................... F16J 15/16
[52] U.S. Cl. ............................ 277/393; 277/399; 277/405
[58] Field of Search ............................. 277/96, 96.1, 96.2, 277/65, 83, 101, 390, 393, 399, 405

[56] References Cited

U.S. PATENT DOCUMENTS

| 2,425,209 | 8/1947 | Snyder et al. | 277/96.2 |
|---|---|---|---|
| 2,447,930 | 8/1948 | Biggs | 277/96.2 |
| 3,770,181 | 11/1973 | Stahl | 277/96.1 |
| 4,261,581 | 4/1981 | Hershey | 277/96.1 |
| 4,613,142 | 9/1986 | Heilala | 277/96.1 |
| 4,890,851 | 1/1990 | Avard et al. | 277/96.1 |
| 5,042,824 | 8/1991 | Gardner et al. | 277/96 |

FOREIGN PATENT DOCUMENTS

| 2 576 077 | 7/1986 | France . |
|---|---|---|
| 2 246 536 | 4/1973 | Germany . |
| 34 287 44 A1 | 2/1985 | Germany . |
| 35 39 100 A1 | 5/1986 | Germany . |
| 5-3737 | 1/1993 | Japan . |
| 2 185 546 | 7/1987 | United Kingdom . |

*Primary Examiner*—Daniel G. DePumpo
*Attorney, Agent, or Firm*—Evenson, McKeown, Edwards & Lenahan, P.L.L.C.

[57] ABSTRACT

The mechanical seal for a compressor comprises a support member fixed to a rotary shaft for rotating therewith, an annular rotating slide member consisting of hard materials and being fitted to the support member by shrinkage, and a stationary slide member exerting pressure against an end surface of said rotating slide member. In order to prevent damage by shrinkage stress and a displacement of said rotating slide member, said rotating slide member comprises at least one peripheral recess formed by a portion of the periphery of said rotating slide member having a smaller outer diameter than the rest of the periphery and said support member comprises an inwardly extending fitting portion engaging the peripheral recess.

9 Claims, 5 Drawing Sheets

MECHANICAL SEAL FOR A COMPRESSOR AND CENTRIFUGAL COMPRESSOR COMPRISING THE MECHANICAL SEAL

BACKGROUND OF AND SUMMARY OF THE INVENTION

The present invention relates to a mechanical seal for a compressor and to a centrifugal compressor comprising the mechanical seal.

A conventional mechanical seal which is used for providing a seal between a casing and a shaft of a centrifugal compressor will be explained by means of FIG. 7 which shows the cross-sectional view of the main part of the conventional mechanical seal.

Two annular rotating slide members 33 are attached to an annular support member 32 by shrinkage. The outer end surface 36 of each slide member 33 forms a sliding surface which contacts an opposed stationary slide member 34 exerting an appropriate pressure on the rotating slide member 33. The rotating slide member 33 and the stationary slide member 34 prevent fluid from leaking out of a centrifugal compressor at the sliding area. The outer diameter of the rotating slide member 33 is constant.

In order to determine the appropriate load for shrinkage fitting the stiffness of the materials of both slide members are to be taken in consideration. The slide members are required to have low friction at the slide surfaces thereof. Because a corrosive gas such as hydrogen sulfide is often dealt with, the slide members have to be resistant against corrosion. Finally the wear has to be small so that the slide members can be used for a period of at least 2 to 3 consecutive years.

For the above mentioned reasons hard materials such as the SiC (silicon carbide) are appropriate for the slide members. However, silicon carbide is a brittle material so that when an excessive load is applied to the slide members, cracks may occur at the surface of the slide members.

On the other hand, after shrink-fitting the rotational slide member 33 and the support member 32 of the conventional mechanical seal of FIG. 7, the rotational slide member 33 is supported at its periphery at the edge 38 of an inwardly extending fitting portion 37 of the support member 32. Therefore, the shrinkage stress acts at an extremely small portion of the periphery of the rotational slide member 33. This causes a stress concentration at a contacting area of the rotaional sliding member 33 and the support member 32 which can generate a cracks on the outer surface of the rotating slide member 33.

In order to reduce the stress concentration it can be considered to round the edge 38 of the fitting portion 37 of the support member 32 as shown in FIG. 6.

However, the rounding of the edge 38 does not prevent the rotating slide member 33 from displacing in axial direction. It is further necessary to consider the additional radial stress which is caused by centrifugal forces.

The shrinkage stress becomes greater when the centrifugal compressor is operated at a higher speed. As the maximum shrinkage fitting load may not exceed a certain value, the shrinkage fitting load for installation has to be below a proper value.

Therefore, an axially displacement or falling out of the rotating slide member 33 may occur due to a lack of supporting force when an impact force is applied to the centrifugal compressor from outside during operation or installing thereof.

Further, when the above-described slide members are used in centrifugal compressor having a rated rotational speed of 5000–20000 rpm, a shaft power of 300–8000 kW, a shaft diameter of 100–200 mm and a seal pressure of 0.5–2 MPa, the peripheral speed of the supporting portion becomes large and the supporting member 32 may deflect by the centrifugal force. Therefore, a radial outward displacement of the rotating slide member 33 occurs. This displacement causes a decrease of the amount of interference between the rotating slide member 33 and the support member 32 during operation.

To overcome this inconvenience, it is needed to provide a larger amount of interference for shrinkage fitting in advance.

In the Japanese Utility model laid-open 5-3737/1993, a mechanical seal made of ceramics is described. Though this seal has a face plate having a shoulder made of ceramics, it merely shows protection of debris coming into the seal region and does not show details how to use in a centrifugal compressor.

It is the problem underlying the present invention to provide a mechanical seal which eliminates the above-mentioned inconveniences of the prior art, can be manufactured or processed easily and has a high reliability.

Further a centrifugal compressor with a high speed and a high reliability seal is to be provided.

This problem is solved by a mechanical seal for a compressor comprising a support member fixed to a rotary shaft for rotating therewith, an annular rotating slide member consisting of hard materials and being fitted to the support member by shrinkage; and a stationary slide member exerting pressure against an end surface of said rotating slide member; wherein said rotating slide member comprises at least one peripheral recess formed by a portion of the periphery of said rotating slide member having a smaller outer diameter than the rest of the periphery; and said support member comprises an inwardly extending fitting portion engaging the peripheral recess.

Advantegeously at least one of the edges of the fitting portion is rounded.

When the mechanical seal is used for a centrifugal compressor having a rotating shaft with a diameter of 100–200 mm, a rated rotational speed of 5000–20000 rpm, a shaft power of 300–8000 kW and a seal pressure of 0.5–2 MPa, the outer diameter of the bottom of the peripheral recess is preferably smaller than the outer diameter of the rest of the periphery by 0.01–0.1 mm and/or the rounded edge of the fitting portion preferably has a radius of curvature of 0.05–0.2 mm.

In a preferred embodiment said rotating slide member has an increased heat transfer area.

Conveniently said rotating slide member is made of silicon carbide.

The mechanical seal of the present invention has a high reliabilty and a simple construction. Therefore it is easy to manufacture.

A centrifugal compressor operated at a rated rotational speed of 5000–20,000 rpm and a seal pressure of 0.52 MPa and including a rotating shaft having an outer diameter of 100–200 mm preferably comprises a mechanical seal of the present invention to have a high reliability.

Other objects, advantages and novel features of the present invention will become apparent from the following detailed description of the invention when considered in conjunction with the accompanying drawings.

DETAILED DESCRIPTION OF THE DRAWINGS

Figure 1:
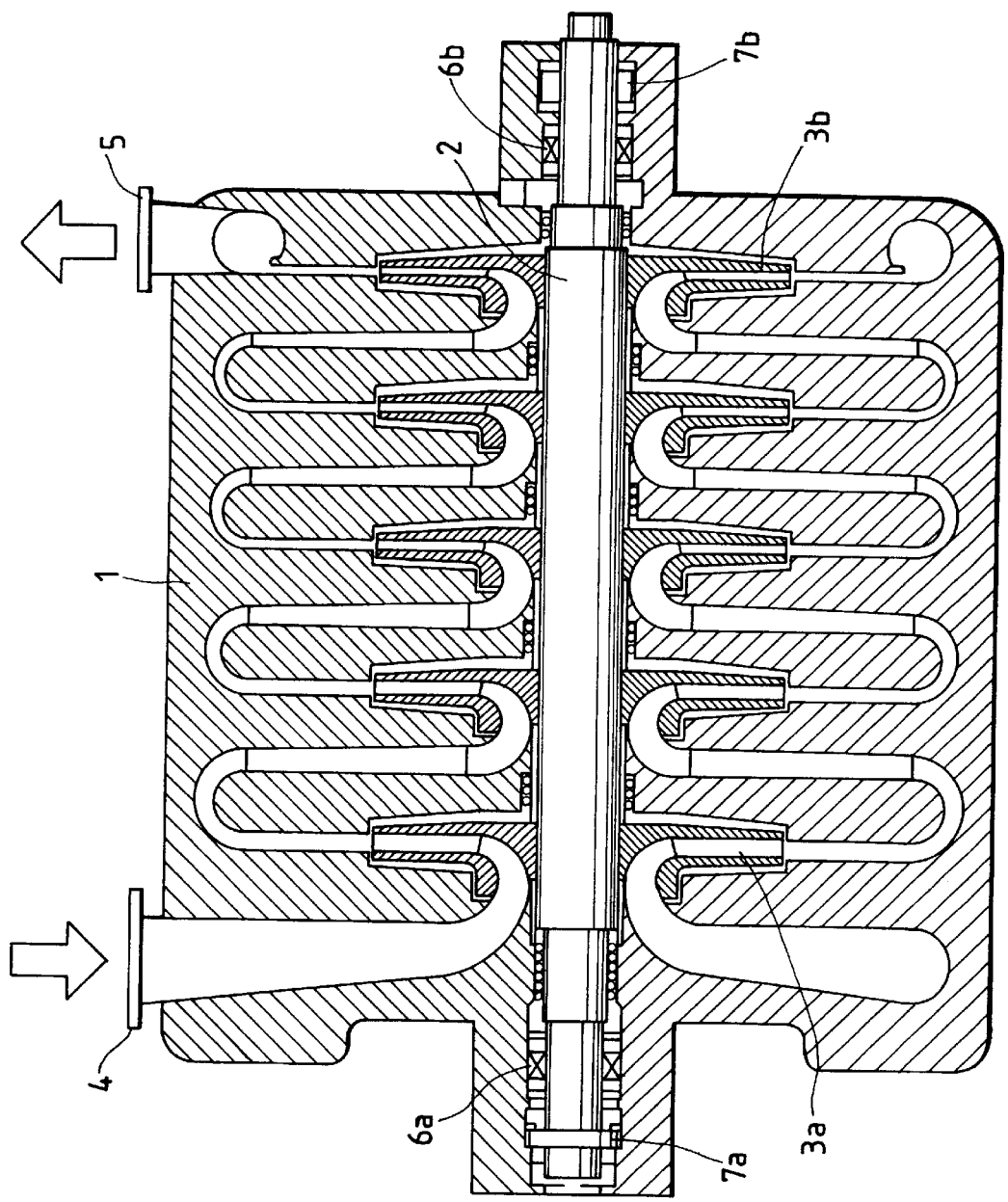
FIG. 1 shows an axial cross-sectional view of a centrifugal compressor of the present invention.

The multistage centrifugal compressor shown in FIG. 1 comprises a casing 1 in which a rotary shaft 2 is rotably supported by means of bearings 7a, 7b. In the casing 1 a suction port 4 and a discharge port 5 are provided. Between the suction port 4 and the discharge port 5 several impellers 3 are attached to the rotary shaft 2 for rotating therewith.

Between the outermost impeller 3a on the suction side and the corresponding bearing 7a a mechanical seal 6a is provided preventing the leakage of fluid from the interior of the casing 1 to the exterior through the space between the shaft 2 and the casing 1.

Between the outermost impeller 3b on the discharge side and the corresponding bearing 7b a further mechanical seal 6b is provided.

Figure 2:
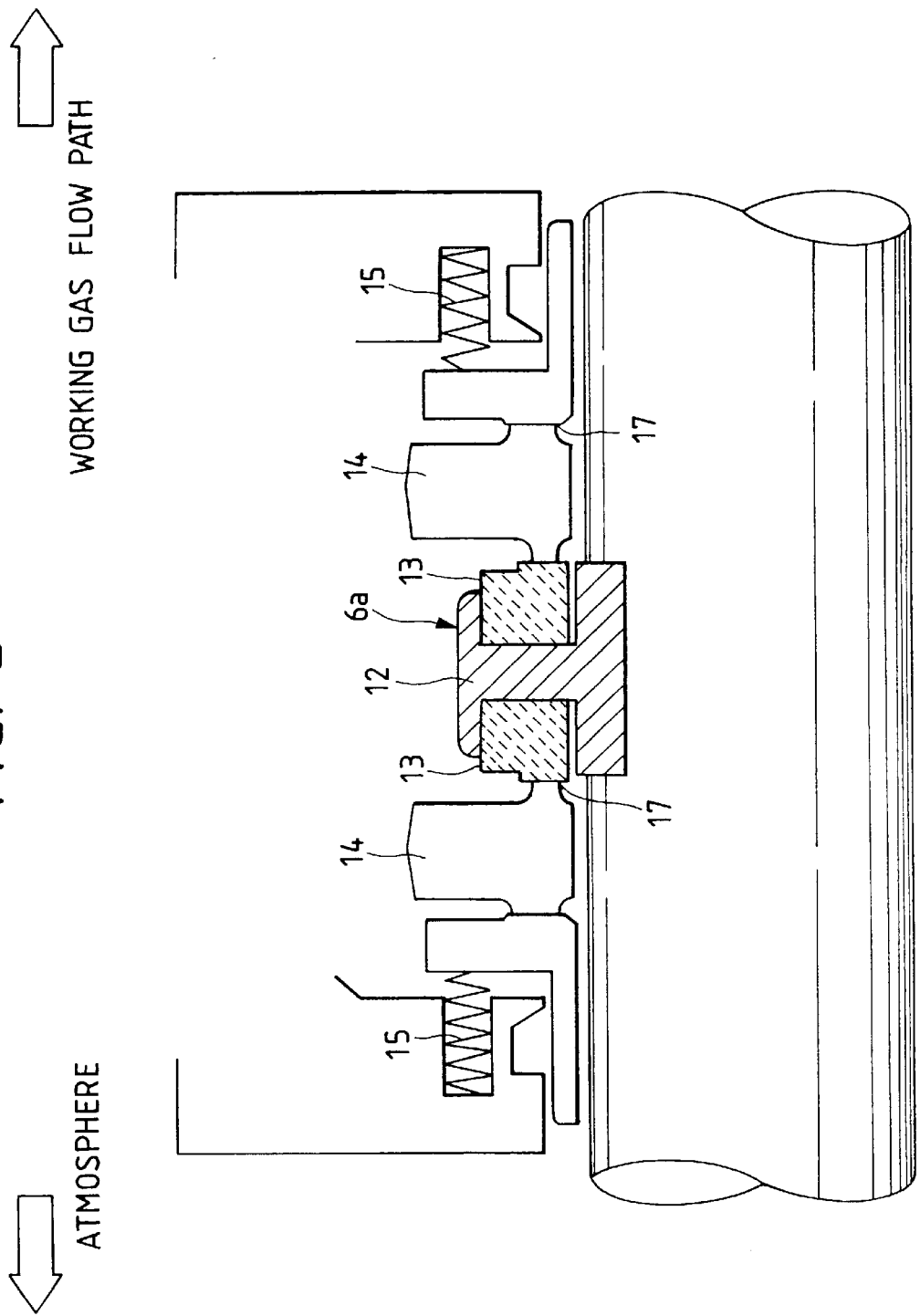
FIG. 2 shows an axial cross-sectional view of a mechanical seal used in the centrifugal compressor of FIG. 1.

The overall construction of the mechanical seal is shown by means of mechanical seal 6a in FIG. 2. The mechanical seal 6a comprises two annular rotating slide members 13 which are attached to the rotating shaft 2 by means of a rotating support member 12 which is fixed to the shaft 2.

The rotating slide members 13 and the support member 12 rotate together with the shaft 2.

The mechanical seal 6a further comprises stationary slide members 14 which exert an appropriate pressure to the opposed end surface of the corresponding rotating slide member 13 by means of a spring 15. Therefore gas inside the compressor is prevented from leaking to the exterior of the compressor at the sliding region 17 at which the rotating slide members 13 contact the corresponding stationary slide member 14.

Figure 3:
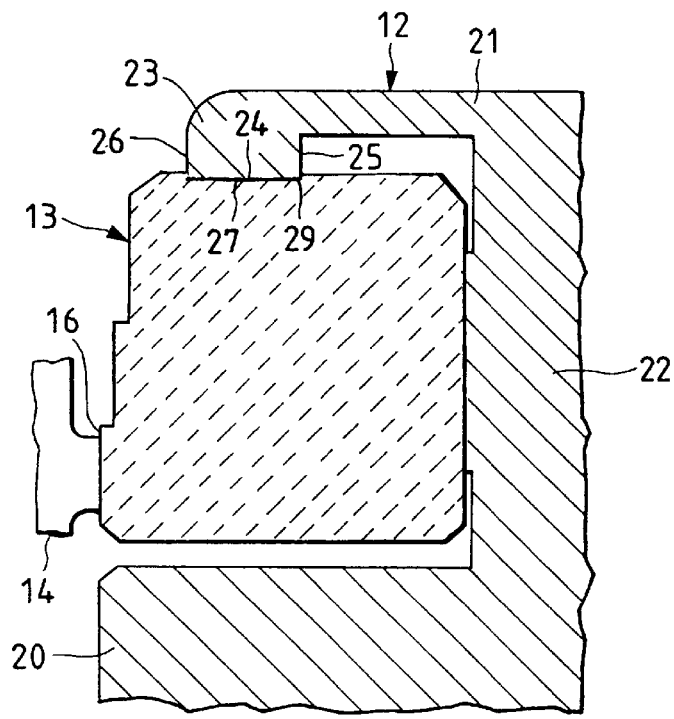
FIG. 3 shows a cross-sectional view of a principal portion of a first embodiment of the mechanical seal of the present invention.

FIG. 3 shows a detail of a mechanical seal for the use in a centrifugal compressor with a rated rotational speed of 5000–20000 rpm, a shaft power of 300–8000 kW, a shaft diameter of 100–200 mm and a seal pressure 0.5–2 MPa.

An example of a appropriate centrifugal compressor has a rated rotational speed of 9990 rpm, a shaft power of 6670 kW, a shaft diameter of 140 mm at the seal location and a seal pressure of 0.7 MPa.

The rotating slide member 13 preferably consists of hard materials such as SiC (silicon carbide). Therefore, the friction at the slide surface 16 is low, corrosion resistance against corrosive gas, such as hydrogen sulfide, is excellent, and the wear is small, so that the seal can be used at least 2 to 3 consecutive years.

The support member 12 consists of stainless steel. The support member 12 comprises an inner ring element 20 which is fixed to the shaft 2 by shrinkage and a coaxial outer ring 21. The inner ring element 20 and the outer ring element 21 are connected by a radially extending web 22.

At at least one axial end of the outer ring 21 a radially inwardly extending fitting portion 23 runs along the inner periphery of the outer ring 21. The fitting portion 23 comprises a cylindrical end surface 24 extending between radially extending side surfaces 25, 26.

The rotating slide member 13 is arranged between the fitting portion 23 and the inner ring element 20 such that it abuts with its other end surface against the web 22.

In the area facing the cylindrical end surface 24 of the fitting portion 23 the outer diameter of the rotating slide member 13 is reduced in the axial direction by 0.01 to 0.1 mm, or preferably approximately 0.05 mm as shown in FIG. 3, so that a recess 27 is formed along the periphery of the rotating slide member 13. Both side walls of the recess 27 are chamfered. Thus, the recess can be relatively easily manufactured even if a silicon carbide is used for the rotating slide member 13.

The width of the recess 27 is somewhat greater than the width of the fitting portion 23. The fitting portion 23 engages the recess 27 such that the cylindrical end surface 24 contacts the bottom of the recess 27 and a predetermined shrinkage stress is provided between the cylindrical end surface 24 and the bottom of the recess 27.

Both edges 29 of the fitting portion 23 are rounded with a radius of curvature of 0.05–0.2 mm, preferably 0.1 mm, so that the fitting portion 23 does not interfere with the chamfered side walls of the recess 27.

As according to the present invention the fitting portion 23 engages the recess 27 the support force against the rotating slide member 13 can be gained for the compressor specified above without increasing the shrinkage fitting load during shrinkage fitting of the rotating support member 12 and rotating slide member 13.

In addition, a shrinkage stress concentration on the surfaces of the rotating slide member 13 and the support member 12 is prevented by the rounding at both edges 29 of the fitting portion 23.

Figure 4:
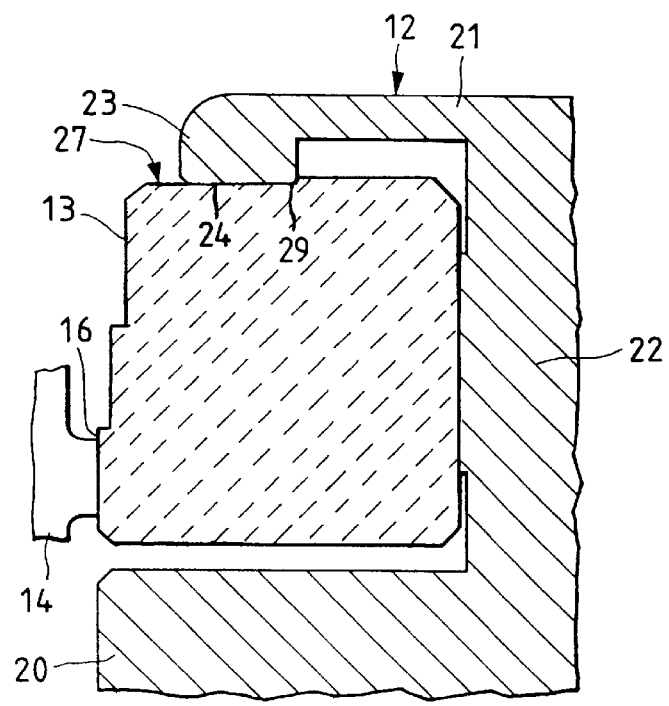
FIG. 4 shows a cross-sectional view of a principal portion of a second embodiment of the mechanical seal of the present invention.

The embodiment of FIG. 4 differs from the embodiment of FIG. 3 in that the recess 27 extends to the end surface of the rotating slide member 13 facing the stationary slide member 14. Therefore the recess 27 is not limited by a side wall on the side of the stationary slide member 14.

The manufacturing of the rotating slide member 13 of the embodiment of FIG. 4 is easier than that of the embodiment of FIG. 3 if the rotating slide member 13 consists of silicon carbide. Nevertheless, with the construction of FIG. 4 falling out of the rotational slide member 13 is better prevented. However, since a step is formed only one side, it is not so effective as the construction shown in FIG. 3 as regards the displacement of the rotating slide member 13.

Figure 5:
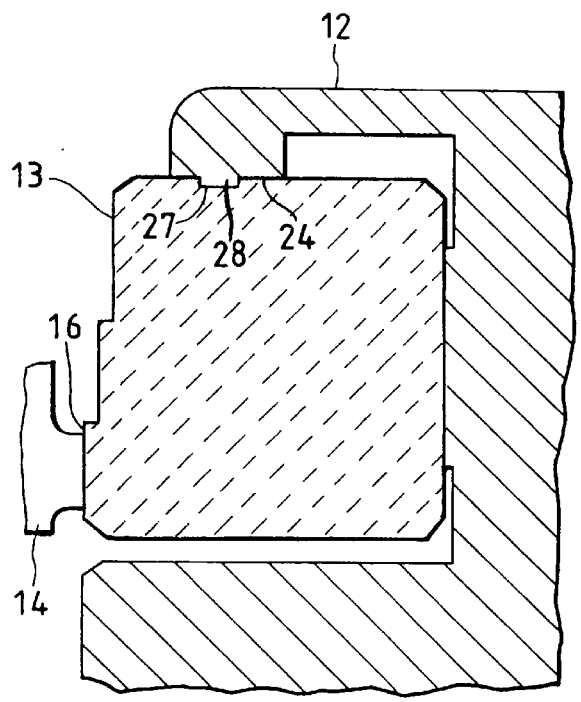
FIG. 5 shows a cross-sectional view of a principal portion of a third embodiment of the mechanical seal of the present invention.
Figure 6:
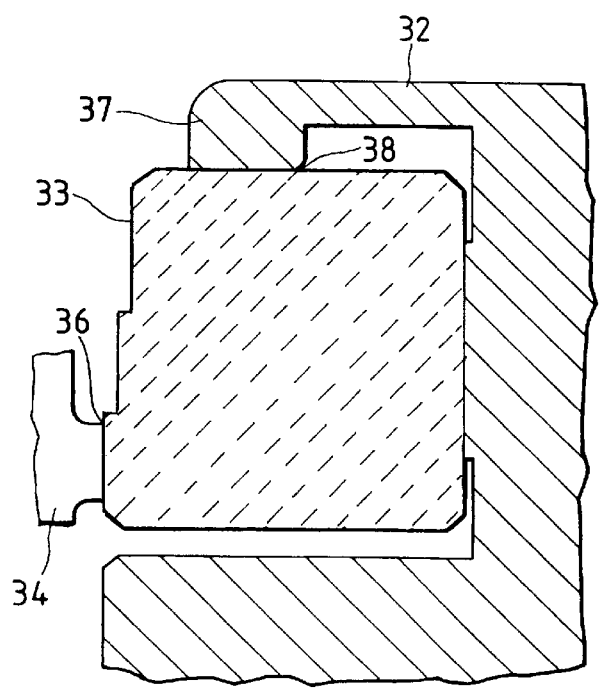
FIG. 6 show a mechanical seal having a rounded edge at a fitting portion of support member in accordance with the present invention.
Figure 7:
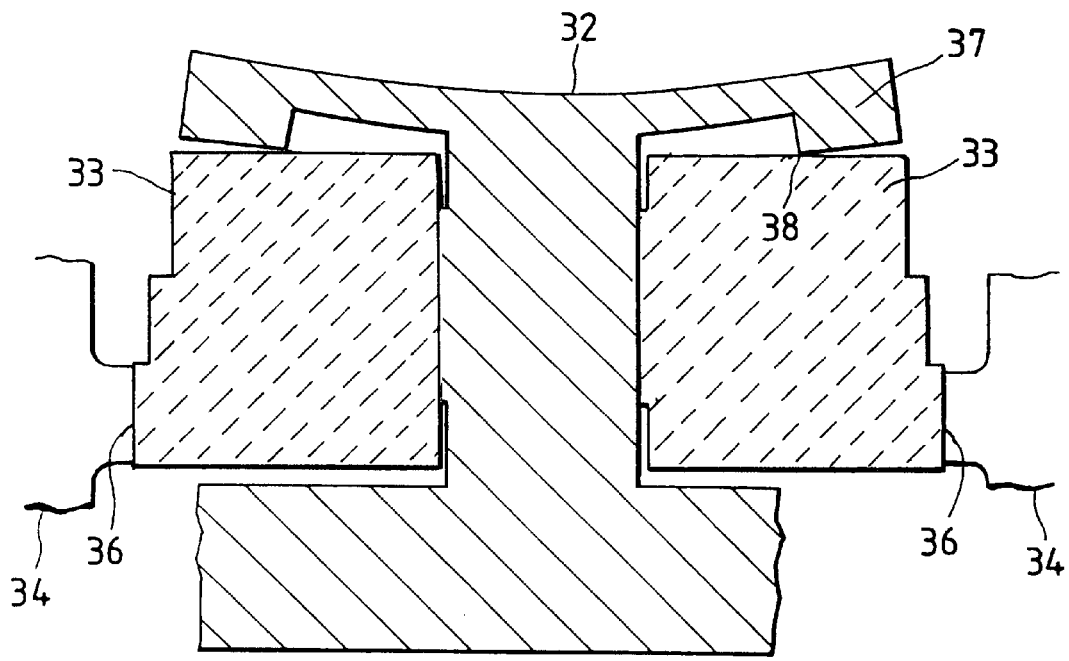
FIG. 7 shows a cross-sectional view of a principal portion of a conventional mechanical seal.

In the embodiment of the mechanical seal of FIG. 5 a circumferential projection 28 extends radially inwardly from the cylindrical end surface 24 of the fitting portion 23. The width of the projection 28 is smaller than the width of the cylindrical end surface 24. The width of the recess 27 substantially corresponds to the width of the projection 28. The projection 28 engages the recess 27 such that a shrinking stress exists between the projection 28 and the bottom of the recess 27.

In order to increase the heat transfer area a plurality of projections 28 and recess 27 can be provided. This involves a better cooling effect for the sliding surface which leads to a better sealing performance.

Although invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A mechanical seal for a compressor comprising:
   a support member fixed to a rotating shaft for rotating therewith;
   an annular rotating slide member consisting of hard materials and being shrink fitted to the support member; and
   a stationary slide member exerting pressure against an end surface of said rotating slide member;
   wherein said rotating slide member further comprises at least one peripheral recess formed by a portion of the periphery of said rotating slide member, having a smaller outer diameter than the rest of the periphery; and
   wherein said support member further comprises an axially extending ring-like member having a free end from which an inwardly extending fitting portion is configured to engage the entire surface of the peripheral recess to effect and maintain the shrink fitting independently of positional variations of the slide member.

2. A mechanical seal according to claim 1, wherein at least one of the edges of the fitting portion is rounded.

3. A mechanical seal according to claim 1, wherein said rotating slide member has an increased heat transfer area.

4. A mechanical seal according to claim 1, wherein said rotating slide member is made of silicon carbide.

5. A mechanical seal for a centrifugal compressor having a rotating shaft with a diameter of 100–200 mm, a rated rotational speed of 5000–20000 rpm, a shaft power of 300–8000 kW and a seal pressure of 0.5–2 Mpa comprising:
   a support member fixed to the rotating shaft for rotating therewith;
   an annual rotating slide member consisting of hard materials and being shrink fitted to the support member; and
   a stationary slide member exerting pressure against an end surface of said rotating slide member;
   wherein said rotating slide member further comprises at least one peripheral recess formed by a portion of the periphery of said rotating slide member, having a smaller outer diameter than the rest of the periphery;
   said support member further comprises an axially extending ring-like member having a free end from which an inwardly extending fitting portion is configured to engage the entire surface of the peripheral recess to effect and maintain the shrink fitting independently of positional variations of the slide member; and
   the outer diameter of the bottom of the peripheral recess is smaller than outer diameter of the rest of the periphery by 0.01–0.1 mm.

6. A mechanical seal according to claim 5, wherein the rounded edge of the fitting portion has a radius of curvature of 0.05–0.2 mm.

7. A mechanical seal according to claim 5, wherein said rotating slide member has a surface configured to provide an increased heat transfer area.

8. A mechanical seal according to claim 5, wherein said rotating slide member is made of silicon carbide.

9. A centrifugal compressor operated at a rated rotational speed of 5000–20000 rpm and a seal pressure of 0.5–2 Mpa comprising:
   a rotating shaft having an outer diameter of 100–200 mm;
   a support member fixed to said rotating shaft for rotating therewith;
   an annual rotating slide member consisting of hard materials and being shrink fitted to the support member; and
   a stationary slide member exerting pressure against an end surface of said rotating slide member;
   wherein said rotating slide member further comprises at least one peripheral recess formed by a portion of the periphery of said rotating slide member, having a smaller outer diameter than the rest of the periphery; and
   said support member further comprises an axially extending ring-like member having a free end from which an inwardly extending fitting portion is configured to engage the entire surface of the peripheral recess to effect and maintain the shrink fitting independently of positional variations of the slide member.

* * * * *